US 10,597,851 B2

(12) United States Patent
Isaka et al.

(10) Patent No.: US 10,597,851 B2
(45) Date of Patent: Mar. 24, 2020

(54) OPERATION DEVICE FOR CONSTRUCTION MACHINE (71) Applicant: Hitachi Construction Machinery Co., Ltd., Taito-ku, Tokyo (JP)

(72) Inventors: Wataru Isaka, Mito (JP); Satoshi Kan, Tsuchiura (JP)

(73) Assignee: Hitachi Construction Machinery Co., Ltd.

( * ) Notice: Subject to any disclaimer, the term of this patent is extended or adjusted under 35 U.S.C. 154(b) by 73 days.

(21) Appl. No.: 15/757,909

(22) PCT Filed: Dec. 12, 2016

(86) PCT No.: PCT/JP2016/088489
§ 371 (c)(1),
(2) Date: Mar. 6, 2018

(87) PCT Pub. No.: WO2017/111083
PCT Pub. Date: Jun. 29, 2017

(65) Prior Publication Data
US 2018/0347148 A1    Dec. 6, 2018

(30) Foreign Application Priority Data
Dec. 25, 2015    (JP) .................................. 2015-253897

(51) Int. Cl.
*E02F 9/20* (2006.01)
*E02F 9/16* (2006.01)
(Continued)

(52) U.S. Cl.
CPC .............. *E02F 9/2004* (2013.01); *E02F 9/16* (2013.01); *F16F 7/00* (2013.01); *F16F 7/06* (2013.01)

(58) Field of Classification Search
CPC .......... E02F 9/2004; E02F 9/166; G05G 1/04; F16F 7/06
See application file for complete search history.

(56) References Cited

U.S. PATENT DOCUMENTS 5,566,778 A * 10/1996 Valier .................... B60K 20/02
180/334
5,860,488 A * 1/1999 Kim ........................ B66C 13/56
180/271

(Continued)

FOREIGN PATENT DOCUMENTS

| CN | 1773027 A | 5/2006 |
| JP | 07-322935 A | 12/1995 |

(Continued)

OTHER PUBLICATIONS

Chinese-language Office Action issued in counterpart Chinese Application No. 201680050803.5 dated Sep. 30, 2019 with English translation (18 pages).

(Continued)

*Primary Examiner* — Nicole T Verley
(74) *Attorney, Agent, or Firm* — Crowell & Moring LLP (57) ABSTRACT A left operating tool stand (39) disposed on the left side of an operator's seat (15) in a wheel loader (1) includes a support member (32), an operating tool stand (39) rotatably disposed to the support member (32) between an operating position and a tilt-up position, and an operating tool (53) disposed at a front end side of the operating tool stand (39) to operate the wheel loader (1). The operating tool stand (39) includes a rotating member (40) that is rotatably mounted about a support pin (33) as a rotational pivot, the supporting pin (33) being disposed to the support member (32), and a cam roller (50) that is rotatably disposed to the rotating member (40) and rotates together with the rotating member (40). A dimension (B) from a rotating center (O) of the (Continued)

rotating member (40) to an operating position contact part (60A1) with which the cam roller (50) comes in contact is formed to be smaller than a dimension (C) from the rotating center (O) of the rotating member (40) to a tilt-up position contact part (60B1) with which the cam roller (50) comes in contact.

7 Claims, 10 Drawing Sheets

(51) Int. Cl.
    *F16F 7/00*         (2006.01)
    *F16F 7/06*         (2006.01)

(56) References Cited

U.S. PATENT DOCUMENTS

| | | | | |
|---|---|---|---|---|
| 7,036,250 | B2 * | 5/2006 | Dressler | E02F 9/2004 |
| | | | | 180/326 |
| 8,039,769 | B2 * | 10/2011 | Asp | B66F 17/00 |
| | | | | 180/272 |
| 8,113,080 | B2 * | 2/2012 | Nishino | E02F 9/2004 |
| | | | | 74/473.16 |
| 8,226,155 | B2 * | 7/2012 | Hill | B60R 21/02 |
| | | | | 296/190.01 |
| 8,573,089 | B2 * | 11/2013 | Nishino | F16H 61/439 |
| | | | | 74/469 |
| 10,066,366 | B2 * | 9/2018 | Yukawa | E02F 9/2004 |
| 10,370,821 | B2 * | 8/2019 | Muramoto | B62D 1/18 |
| 2009/0174243 | A1 * | 7/2009 | Nathan | B60N 2/206 |
| | | | | 297/325 |
| 2010/0300241 | A1 * | 12/2010 | Barcin | B60T 7/104 |
| | | | | 74/523 |

FOREIGN PATENT DOCUMENTS

| | | |
|---|---|---|
| JP | 9-13425 A | 1/1997 |
| JP | 10-252100 A | 9/1998 |
| JP | 10-280481 A | 10/1998 |
| JP | 2003-204839 A | 7/2003 |
| JP | 2011-183878 A | 9/2011 |
| KR | 10-2005-0117235 A | 12/2005 |

OTHER PUBLICATIONS

International Search Report (PCT/ISA/220 & PCT/ISA/210) issued in PCT Application No. PCT/JP2016/088489 dated Apr. 4, 2017 with English translation (Nine (9) pages).

Japanese-language Written Opinion (PCT/ISA/237) issued in PCT Application No. PCT/JP2016/088489 dated Apr. 4, 2017 (three (3) pages).

* cited by examiner

OPERATION DEVICE FOR CONSTRUCTION MACHINE

TECHNICAL FIELD

The present invention relates to an operation device for construction machines, which is used in, for example, a construction machine such as a wheel loader, a hydraulic excavator or the like.

BACKGROUND ART

Generally, a construction machine, such as a wheel loader, a hydraulic excavator or the like, is equipped with an operation device disposed on both left and right sides of an operator's seat. In this case, the operation device located between the operator's seat and an entrance way is configured to be able to retract rearward to ensure a wider entrance passage for smooth passage of an operator (Patent Document 1).

PRIOR ART DOCUMENT

Patent Document

Patent Document 1: Japanese Patent Laid-Open No. H9-13425 A

SUMMARY OF THE INVENTION

Incidentally, the above-described operation device disclosed in Patent Document 1 is configured such that a gas damper is used for a reduction in the rotating speed when the operation device is moved down from a tilt-up position in the rearward retracted state to an operating position in the forward lowered state. Therefore, there is a disadvantageous problem that the operating force is increased when the operation device is moved down. The gas damper must be disposed within the operation device, which gives rise to a disadvantageous problem of upsizing the operation device.

The present invention is made in view of the above problems in the conventional art and it is an object of the present invention to provide an operation device for a construction machine in which an operating force required for rotating operation is reduced, as well as a reduction in size is achieved.

An operation device for a construction machine according to the present invention includes: a support member that is disposed on at least one of both left and right sides of an operator's seat installed in the construction machine; an operating tool stand that is mounted to the support member and is rotatable between an operating position in which the operating tool stand extends forward from the support member and a tilt-up position in which the operating tool stand extends upward with respect to the support member; and an operating tool that is disposed at a front end side of the operating tool stand to operate the construction machine. In the operation device for the construction machine, the operating tool stand includes: a rotating member that is rotatably mounted about a support pin as a rotational pivot, the supporting pin being mounted to the support member; and a cam roller that is rotatably mounted to the rotating member and rotates together with the rotating member. The support member is provided with an elastic member that has a contact surface with which the cam roller comes in elastic contact in accordance with rotation of the rotating member. The contact surface of the elastic member has an operating position contact part with which the cam roller comes in contact in the operating position, and a tilt-up position contact part with which the cam roller comes in contact in the tilt-up position. A dimension from a rotating center of the rotating member to the operating position contact part is formed to be smaller than a dimension from the rotating center of the rotating member to the tilt-up position contact part.

According to the present invention, the dimension from the rotating center of the rotating member to the operating position contact part is formed to be smaller than the dimension from the rotating center of the rotating member to the tilt-up position contact part. Therefore, when the operating tool stand is in other than the operating position side, the amount of deformation of the elastic member for the cam roller can be decreased. Because of this, the operating force required to rotate the operating tool stand can be reduced.

Since the cam roller comes in elastic contact with the elastic member to control the rotating speed of the operating tool stand, the downsizing of the operation device can be achieved.

MODE FOR CARRYING OUT THE INVENTION

Hereinafter, an embodiment of an operation device for a construction machine according to the present invention will be described in detail with reference to FIG. 1 to FIG. 10, by taking a case where the operation device is installed on a wheel loader which is an example of the construction machine, as an example.

Figure 1:
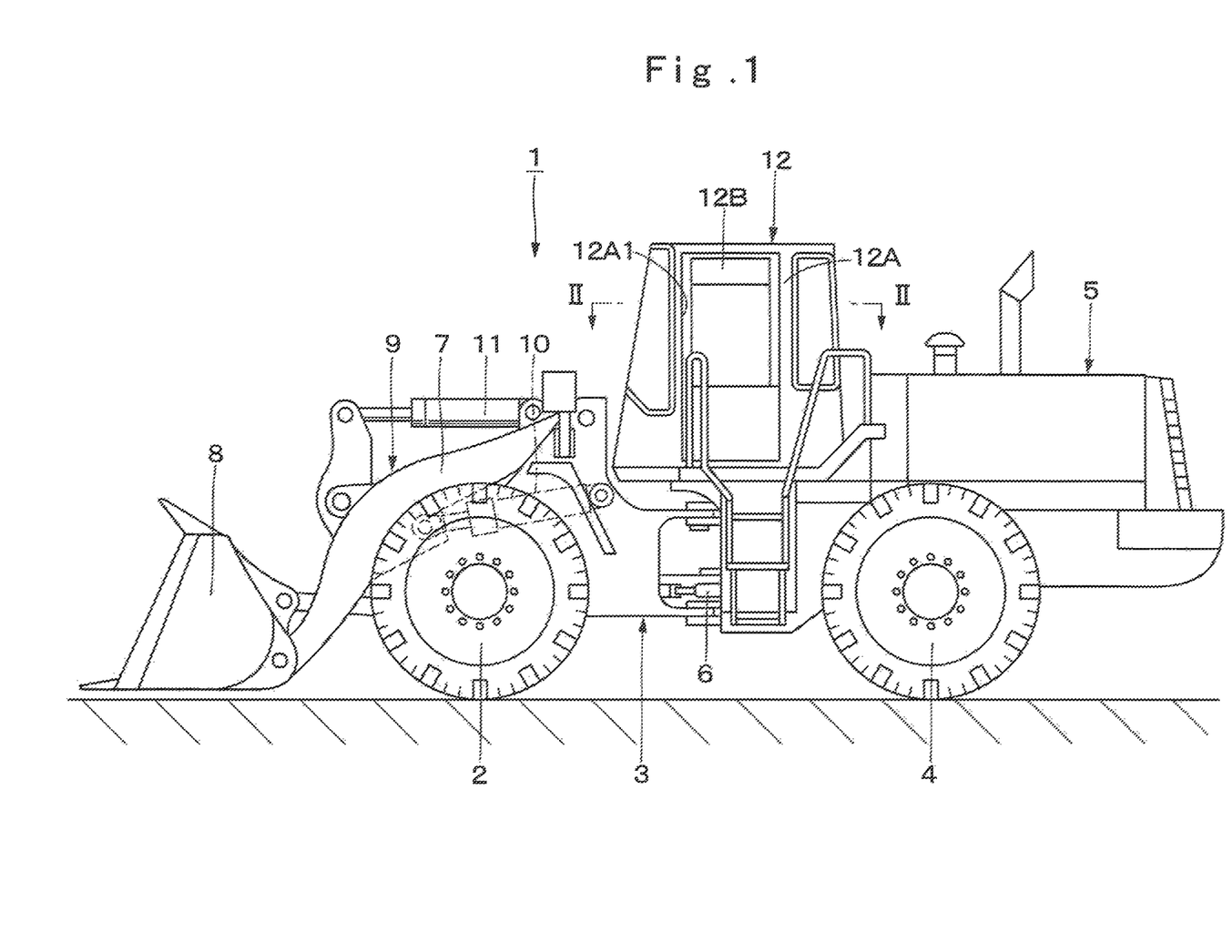
FIG. 1 is a side view of a wheel loader which is an example of construction machines.

A wheel loader 1 includes a front body 3 provided with left and right front wheels 2, and a rear body 5 provided with left and right rear wheels 4, the front body 3 and the rear body 5 being coupled via a center pin at which the front body 3 and the rear body 5 can bend in a left-right direction. The wheel loader 1 is configured as an articulate working vehicle, which is steered by using a steering cylinder 6 to bend the front body 3 and the rear body 5 in the left-right direction.

Here, the front body 3 of the wheel loader 1 is provided with a cargo handling device (working device) 9 including an arm 7 and a bucket 8, the cargo handling device (working device) 9 being mounted to be capable of tilting/lifting thereto. The arm 7 is rotated (tilted/lifted) about its proximal end as a rotational pivot in an up/down direction by driving an arm cylinder 10. The bucket 8 as a working tool is attached to a tip end of the arm 7, and the bucket 8 is rotated in the up/down direction (crowds or dumps) by driving a bucket cylinder 11.

Figure 2:
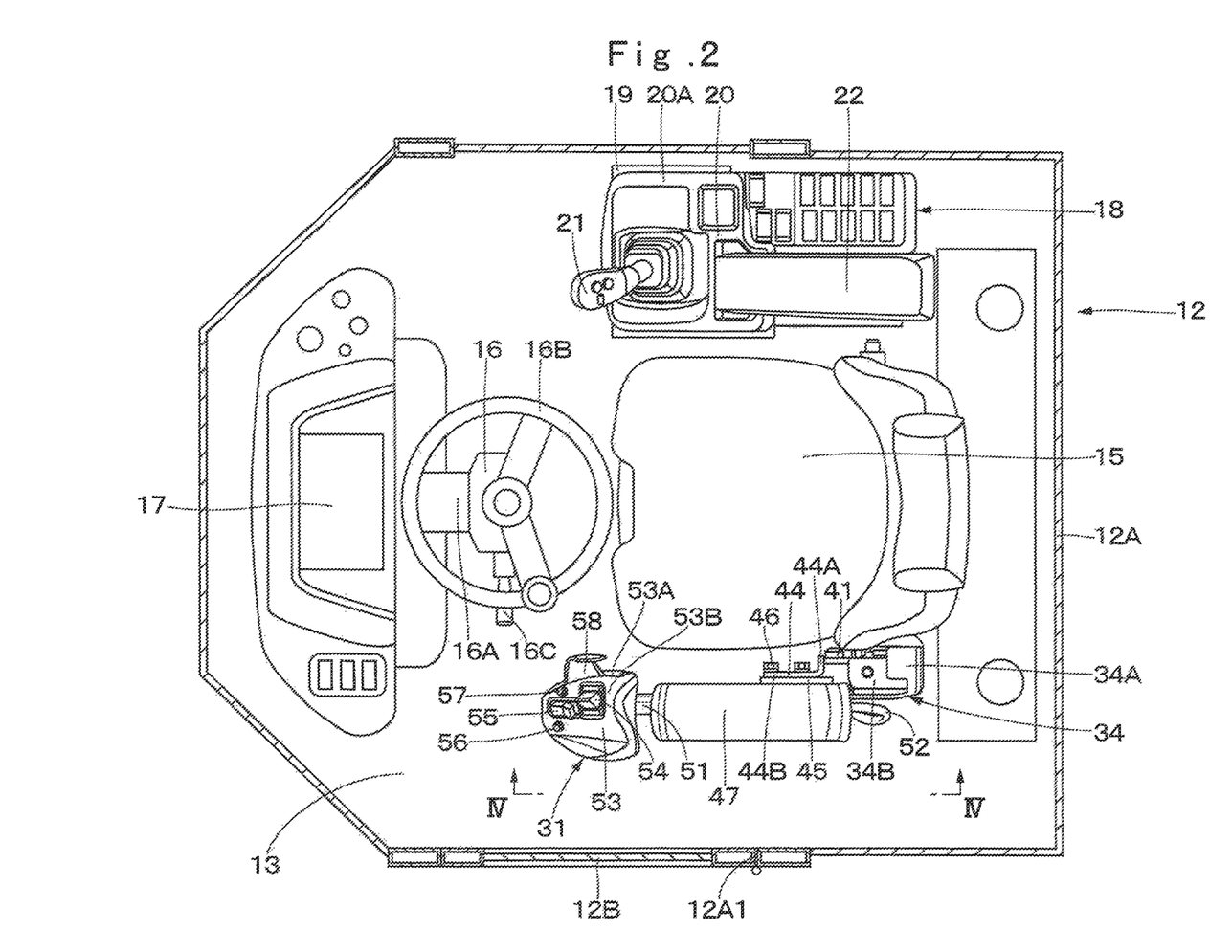
FIG. 2 is a cross sectional view of the interior of a cab in the wheel loader shown in FIG. 1, as seen from a direction of arrows II-II.

On the other hand, the rear body 5 of the wheel loader 1 is provided with a cab 12 defining an operator's room, an unshown engine, a transmission and the like mounted thereon. The cab 12 is formed in a box shape by covering the bottom of a cab box 12A with a floor plate 13. In the left side of the cab box 12A, a door 12B is provided to open/close an entrance way 12A1. An entrance passage for an operator is formed between the entrance way 12A1 and an operator's seat 15 which will be described later. An operator's seat support platform 14 is provided in an approximately central part of the floor plate 13. The operator's seat support platform 14 forms a pedestal which supports the later-described operator's seat 15 in such a manner as to be capable of adjusting a position thereof in a front-rear direction.

Figure 3:
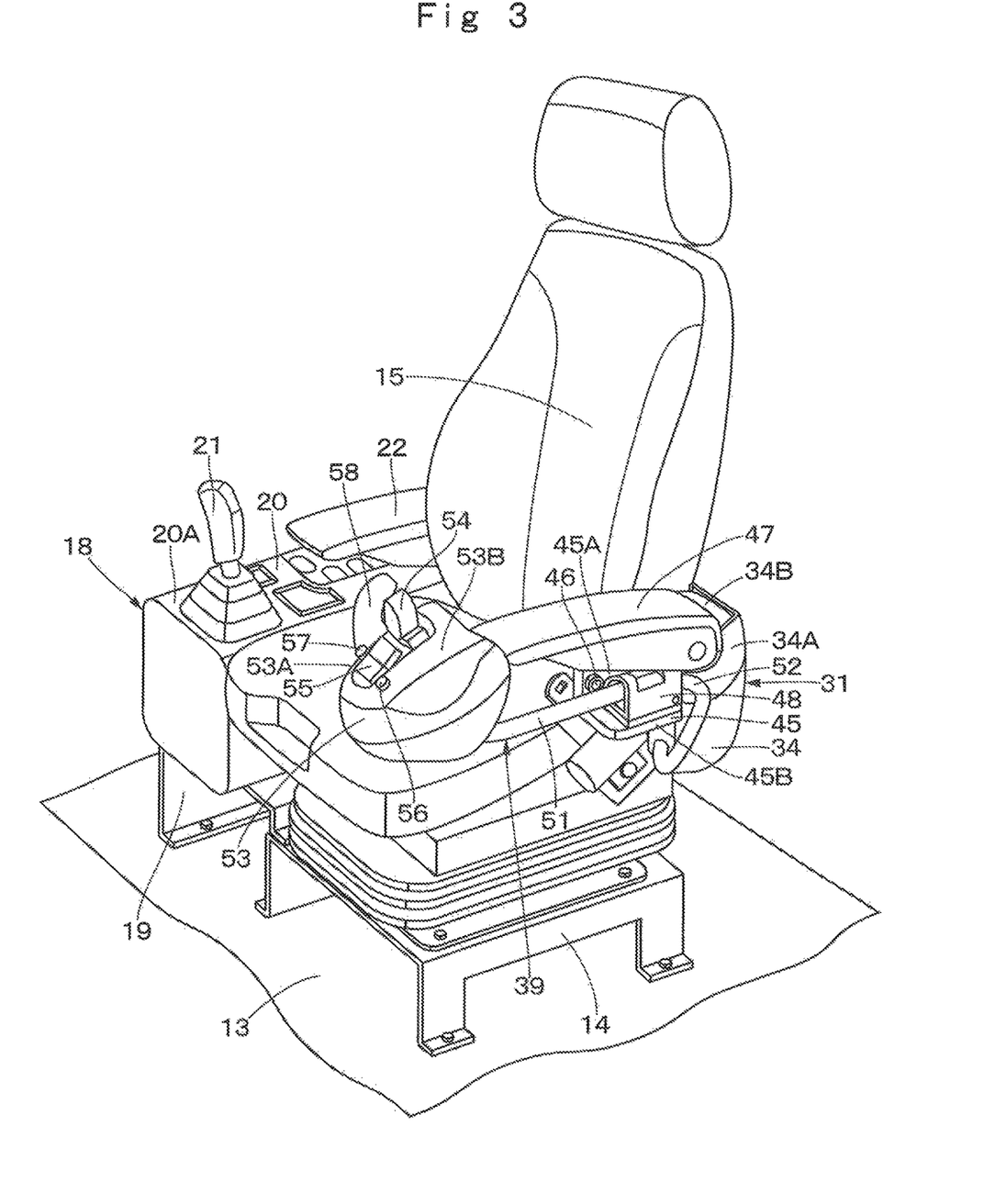
FIG. 3 is a perspective view of an operator's seat, a left operation device and a right operation device in FIG. 2 as seen from the diagonally left front side.

The operator's seat 15 is disposed on the operator's seat support platform 14. The operator's seat 15 is provided for the operator to sit on when he/she operates the wheel loader 1. A travel steering device 16 is disposed in front of the operator's seat 15. A right operation device 18 is disposed on the right side of the operator's seat 15, while a left operation device 31 is disposed on the left side thereof.

The steering device 16 is positioned in front of the operator's seat 15 and is erected on the floor plate 13. The steering device 16 is disposed in an approximately horizontally central position forward of the operator's seat 15, that is, in a position in front of the operator sitting on the operator's seat 15. The steering device 16 is provided at the front side of the interior of the cab 12 and is configured to include: a column 16A which is attached to a measuring instrument display device 17 to display measuring instruments and/or the like and extends in the up-down direction; a steering wheel 16B which is attached at a top end side of the column 16A; and a forward-reverse lever 16C which is located below the steering wheel 16B to project leftward from the column 16A.

The forward-reverse lever 16C is operated to cause the wheel loader 1 to travel. The forward-reverse lever 16C is shifted among three stages composed of a forward position, a neutral position and a reverse position. The wheel loader 1 can travel forward by, for example, operating the forward-reverse lever 16C to shift from the neutral position to the forward position, and then depressing an accelerator pedal (not shown) which is disposed on the floor plate 13 below the measuring instrument display device 17. The traveling direction of the wheel loader 1 is controlled through a rotational operation of the steering wheel 16B.

The right operation device 18 is disposed on the right side of the operator's seat 15. The right operation device 18 is configured to include a console 20, an operating lever 21 and a right armrest 22. The console 20 is mounted on an operation device support platform 19 which is arranged adjacent to the right side of the operator's seat support platform 14 on the floor plate 13. The operating lever 21 is disposed on a top surface 20A of the console 20. The right armrest 22 is disposed behind the operating lever 21 for the operator to rest his/her elbow on when he/she sits on the operator's seat 15.

The operating lever 21 is provided for operating the arm cylinder 10 and the bucket cylinder 11. For example, moving the operating lever 21 toward the front-rear direction causes the arm 7 to rotate upward or downward, and moving the operating lever 21 toward the left-right direction causes the bucket 8 to rotate upward or downward. The operating lever 21 is equipped with a shift down switch, an alarm switch and/or the like.

Next, an explanation will be made of the left operation device 31.

The left operation device 31 is disposed on the left side of the operator's seat 15. The left operation device 31 is positioned between the operator's seat 15 and the entrance-way 12A1 of the cab box 12A, and configures an operation device in accordance with the present embodiment. The left operation device 31 is configured to include a support member 32, an operating tool stand 39 and an operating tool 53.

The support member 32 is disposed on the left side of a backrest of the operator's seat 15. The support member 32 is attached, for example, to the left side surface of the backrest of the operator's seat 15 and/or to the operator's seat support platform 14. The support member 32 includes a right surface plate 32A that extends in the up-down direction along the left side surface of the backrest of the operator's seat 15, an approximate L-shaped cover mounting plate 32B that is secured to a top end and a rear end of the right surface plate 32A by welding or the like and a left surface plate 32C that is disposed leftward of the right surface plate 32A to create a predetermined gap A (refer to FIG. 8) in between and is secured to the right surface plate 32A and the cover mounting plate 32B by welding or the like.

Figure 8:
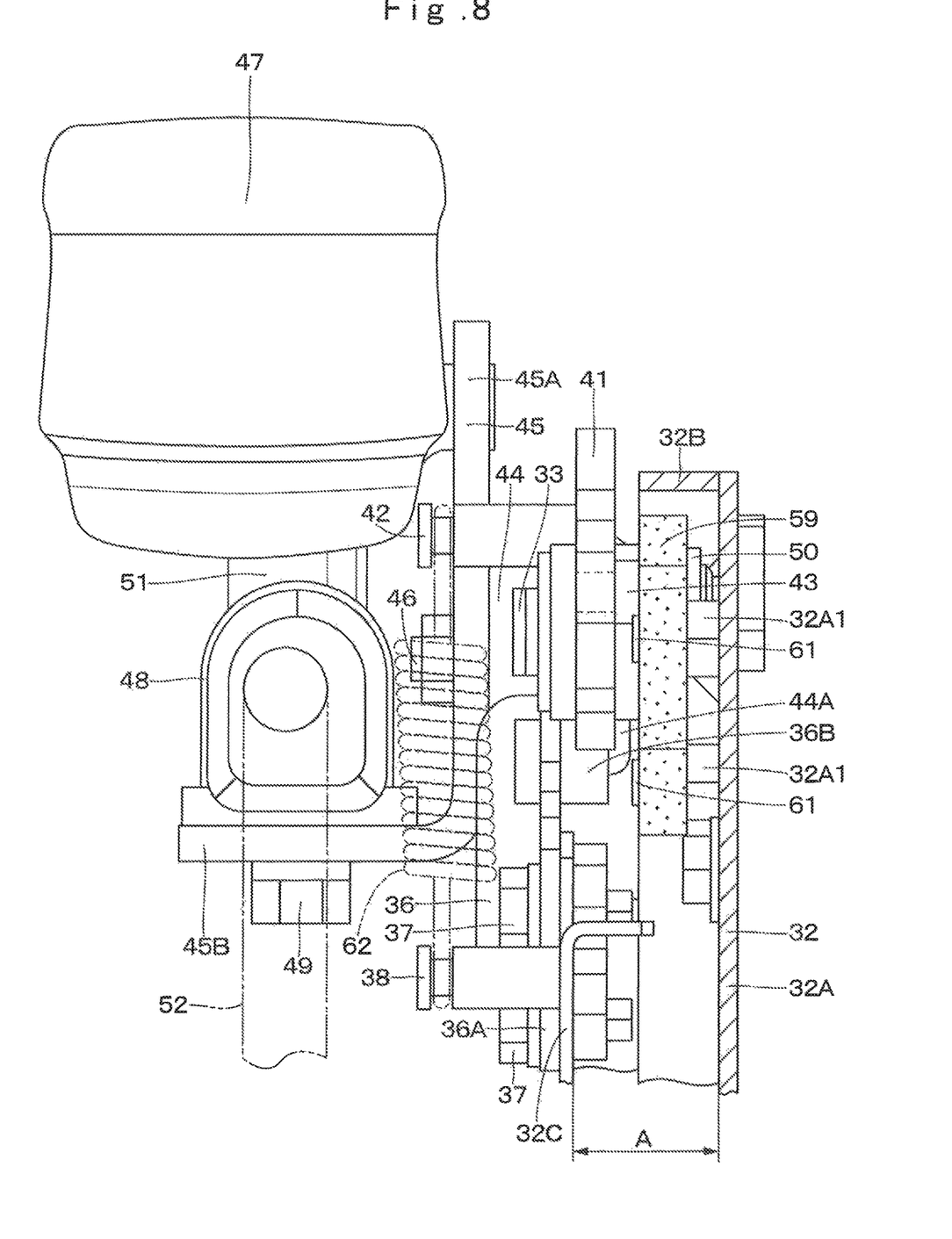
FIG. 8 is a cross sectional view of the left operation device as seen from a direction of arrows VIII-VIII in FIG. 5.

A support pin 33 is disposed on the front side of an upper end of the right surface plate 32A and extends leftward from the right surface plate 32A. A rotating member 40 which will be described later is attached to the tip (left) end side of the support pin 33. On the other hand, as shown in FIG. 8, nuts 32A1 to which a later-described elastic member 59 is attached are secured to the rear side of an upper end of the right surface plate 32A by welding or the like.

The cover mounting plate 32B is provided with a cover 34 attached thereto. The cover 34 is attached thereto by screwing bolts 35 into nuts 32B1 secured to the cover mounting plate 32B. The cover 34 includes a base cover part 34A that covers a left side or a rear side of the support member 32, and a rotating cover part 34B that is rotatably attached to the base cover part 34A and covers an upper side of the support member 32. The rotating cover part 34B is rotated following the rotation of the later-described operating tool stand 39 between the operating position (the state in FIG. 5) and the tilt-up position (the state in FIG. 7).

A stopper 36 is attached to a front end side of the left surface plate 32C. The stopper 36 includes a mounting plate part 36A and a restricting projection 36B, in which the mounting plate part 36A is mounted to the left surface plate 32C with bolts 37 to project upward beyond a top end of the left surface plate 32C, and the restricting projection 36B extends toward the right side (toward the right surface plate 32A) from a top end side of the mounting plate part 36A to restrict the rotation of a rotating plate member 41 which will be described later.

The stopper 36 holds the later-described operating tool stand 39 in the operating position and in the tilt-up position. Specifically, the stopper 36 operates such that, when the operating tool stand 39 is in the operating position, an operating position abutting part 41A of the rotating plate member 41 comes in contact with the restricting projection 36B to restrict a further rotation of the rotating member 40 (refer to FIG. 10). The stopper 36 also operates such that, when the operating tool stand 39 is in the tilt-up position, a tilt-up position abutting part 41B of the rotating plate member 41 comes in contact with the restricting projection 36B to restrict a further rotation of the rotating member 40 (refer to FIG. 7).

A lower side fixing part 38 is positioned in an approximately central part of the left surface plate 32C to project toward the left side from the left surface plate 32C. The lower side fixing part 38 locks a bottom end side of a spring 62 which will be described later.

The operating tool stand 39 is disposed on the right surface plate 32A of the support member 32. The operating tool stand 39 is rotatable between the operating position extending forward from the support member 32 (the state in FIG. 2 to FIG. 5), and the tilt-up position extending upward with respect to the support member 32 (the state in FIG. 7). The operating tool stand 39 is configured to include the rotating member 40, a cam roller 50 and a hollow pipe 51.

The rotating member 40 is rotatably attached on the support member 32 about the support pin 33 as a rotational pivot (rotating center O) and the support pin 33 is attached to the support member 32. The rotating member 40 is configured to include a rotating plate member 41, an armrest fixing plate 44 and a mounting plate 45.

The rotating plate member 41 of the rotating member 40 is formed in a plate-shaped body facing the right surface plate 32A of the support member 32. The rotating plate member 41 is arranged to be interposed between the mounting plate part 36A of the stopper 36 and the right surface plate 32A. The rotating plate member 41 is rotatably attached to the support pin 33. The operating position abutting part 41A is formed in a lower end side of the rotating plate member 41, which abuts on the restricting projection 36B of the stopper 36 when the operating tool stand 39 is in the operating position. On the other hand, the tilt-up position abutting part 41B is formed in a rear lower end side of the rotating plate member 41, which abuts on the restricting projection 36B of the stopper 36 when the operating tool stand 39 is in the operating position.

Figure 5:
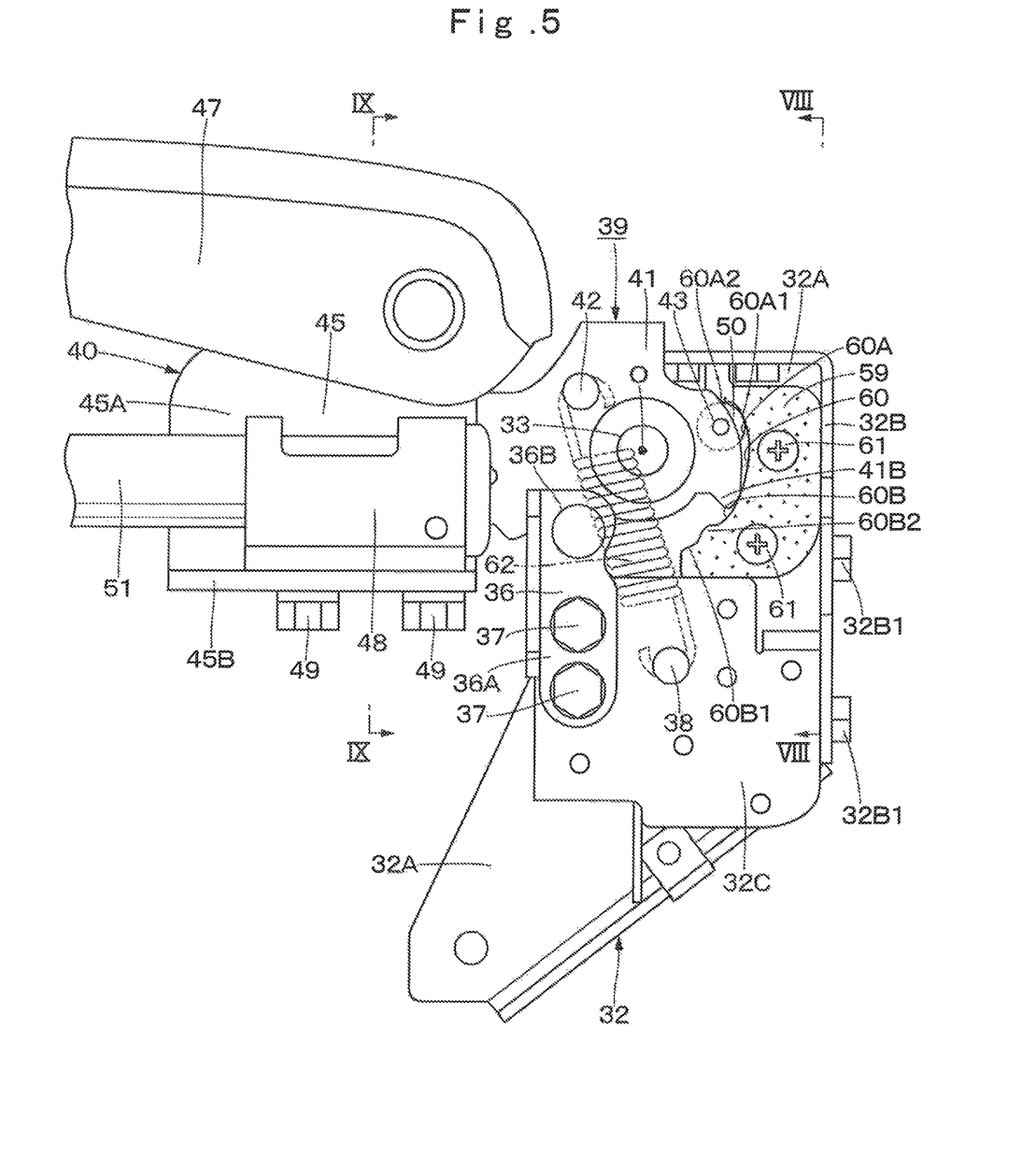
FIG. 5 is an enlarged side view of an essential part of the left operation device in FIG. 4 in a state in which a cover is removed (operating position).
Figure 7:
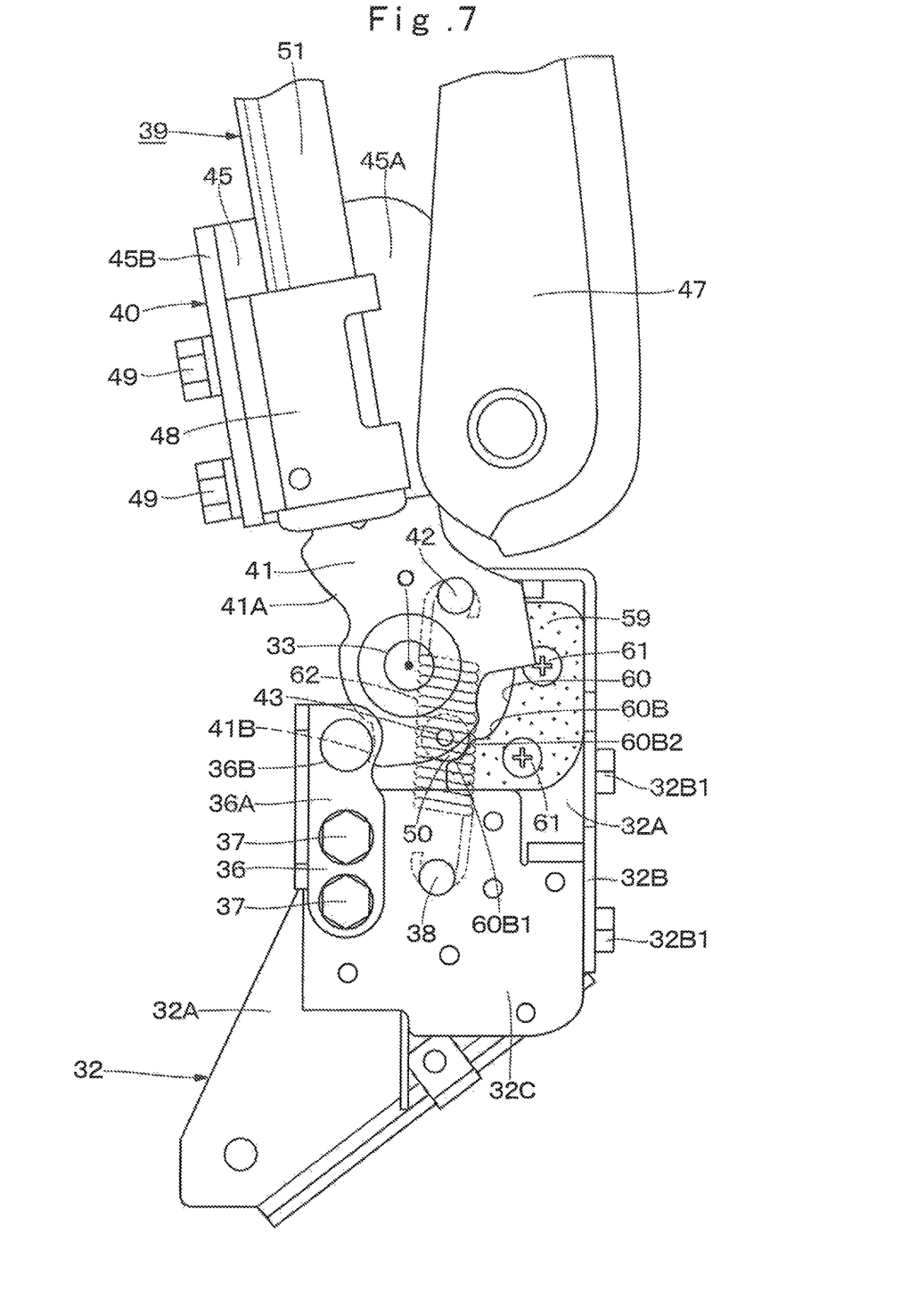
FIG. 7 is an enlarged side view of an essential part of the left operation device in FIG. 5 in a state in which the operating tool stand is raised by 80 degrees (tilt-up position).

Specifically, as shown in FIG. 5, when the operating tool stand 39 is in the operating position, the operating position abutting part 41A of the rotating plate member 41 abuts on the restricting projection 36B of the stopper 36. Thus, the rotation of the rotating plate member 41 is restricted, so that the operating tool stand 39 is inhibited from moving further downward. On the other hand, as shown in FIG. 7, when the operating tool stand 39 is in the tilt-up position, the tilt-up position abutting part 41B of the rotating plate member 41 abuts on the restricting projection 36B of the stopper 36. Thus, the rotation of the rotating plate member 41 is restricted, so that the operating tool stand 39 is inhibited from moving down further rearward.

An upper side fixing part 42 is positioned upward of the rotating center O of the rotating plate member 41 and projects toward the left side from the rotating plate member 41. The upper side fixing part 42 is provided to lock a top end side of a later-described spring 62. The upper side fixing part 42 is configured to be positioned forward of the lower side fixing part 38 when the operating tool stand 39 is in the operating position, and to be positioned rearward of the lower side fixing part 38 when the operating tool stand 39 is in the tilt-up position.

A projecting pin 43 is disposed on a rear end side of the rotating plate member 41 to project toward the right side (toward the right surface plate 32A) from the rotating plate member 41. The later-described cam roller 50 is rotatably attached to the projecting pin 43.

Figure 9:
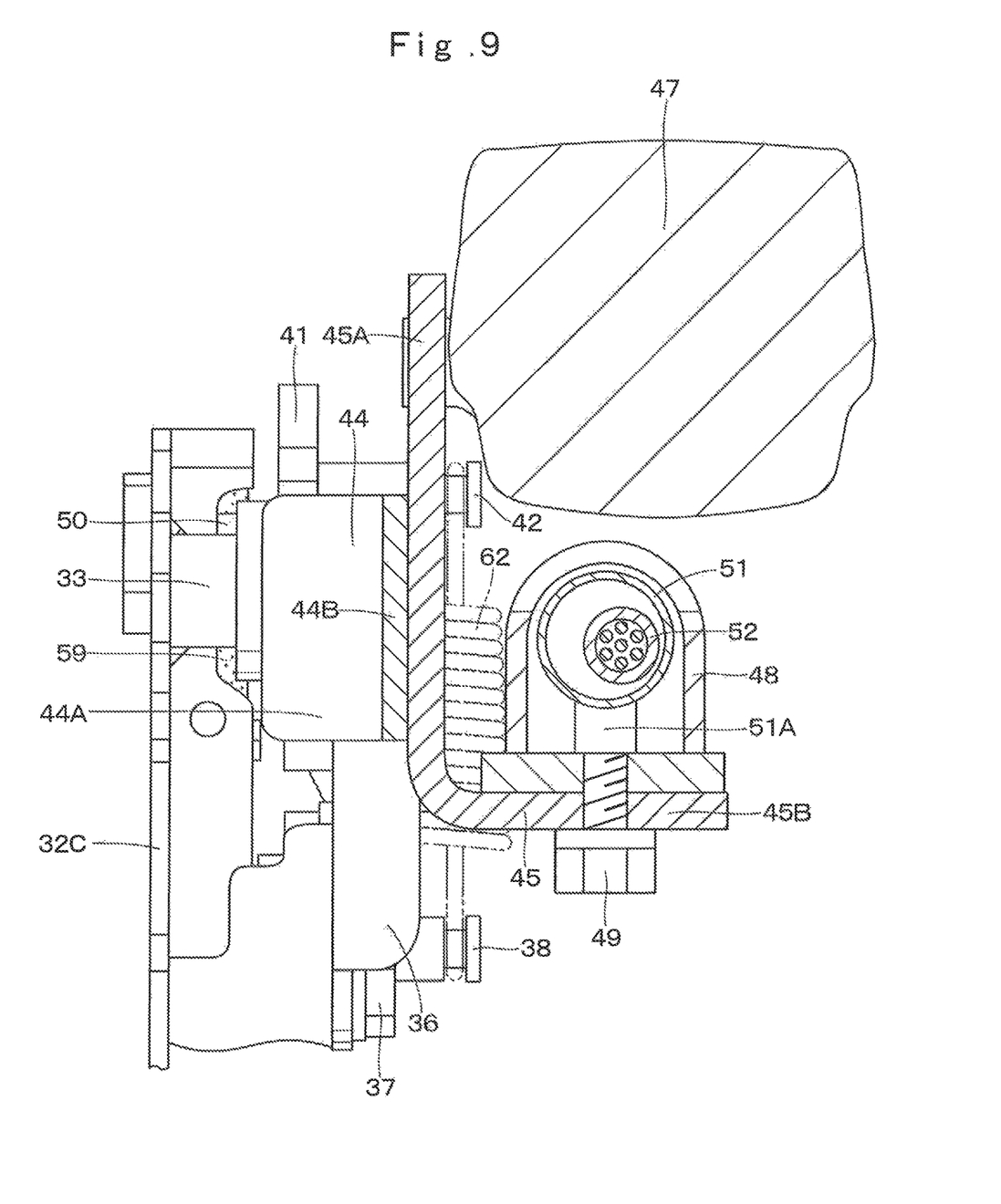
FIG. 9 is a cross sectional view of the left operation device as seen from a direction of arrows IX-IX in FIG. 5.

The armrest fixing plate 44 is secured to a front end side of the rotating plate member 41 by welding or the like. As shown in FIG. 2 and FIG. 9, the armrest fixing plate 44 is formed in an approximate L shape configured of a rotating-member connecting plate part 44A that is secured to a front end side of the rotating plate member 41, and an extension plate part 44B that extends toward a front side from a left end side of the rotating-member connecting plate part 44A.

The mounting plate 45 is attached to the extension plate part 44B of the armrest fixing plate 44. The mounting plate 45 is formed to include an armrest mounting plate part 45A that is secured to a left surface of the extension plate part 44B with bolts 46, and a hollow-pipe mounting plate part 45B that extends toward the left side from a lower end of the armrest mounting plate part 45A. Therefore, the mounting plate 45 is formed in an L shape as a whole.

A left armrest 47 for the operator to rest his/her arm on is rotatably attached to an upper end side of a left surface of the armrest mounting plate part 45A. On the other hand, on a top surface of the hollow-pipe mounting plate part 45B, a hollow-pipe insertion tool 48 in an approximate U shape in horizontal section is disposed. The hollow-pipe insertion tool 48 is positioned under the left armrest 47 and secured to the hollow-pipe mounting plate part 45B with bolts 49.

Figure 10:
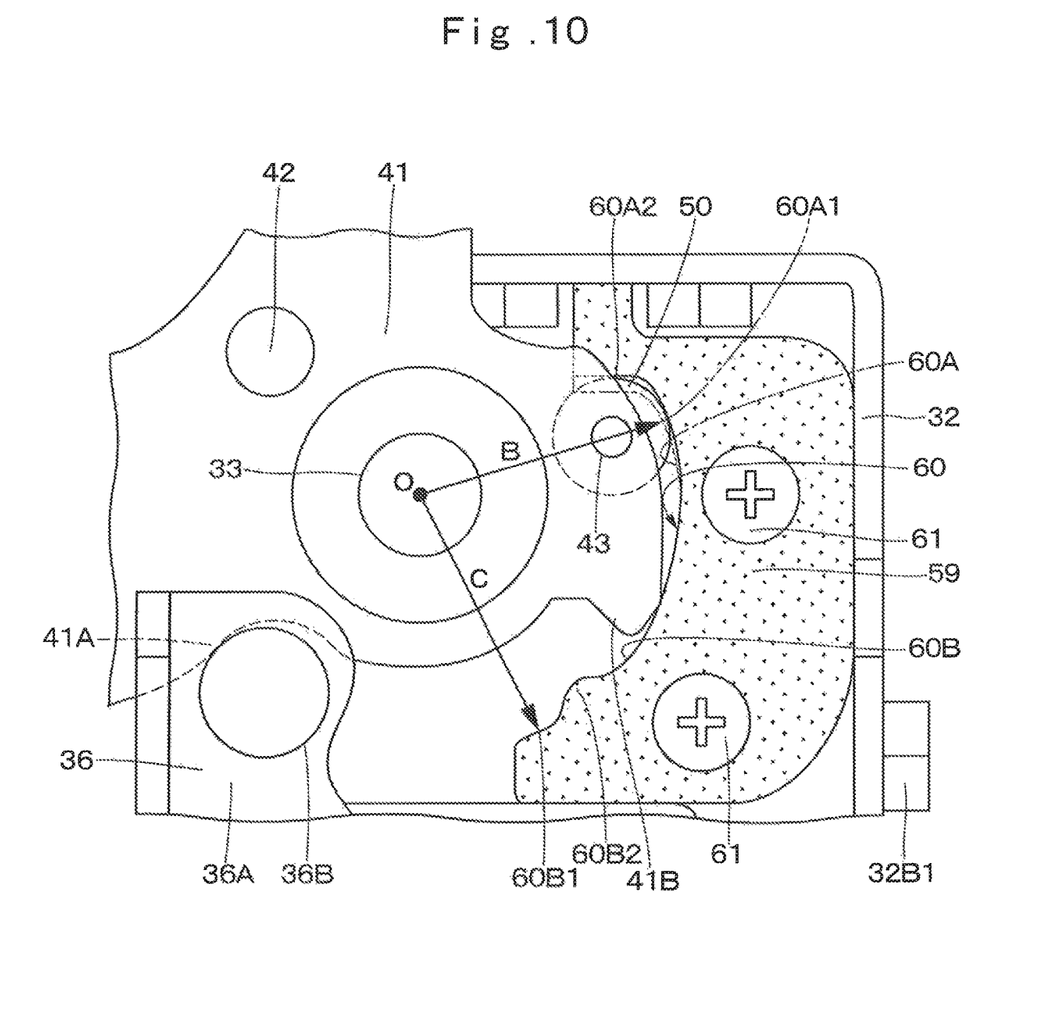
FIG. 10 is an enlarged side view of an essential part, showing a rotating plate member, a cam roller, an elastic member and the like in FIG. 5.

The cam roller 50 is rotatably arranged on the rotating plate member 41 of the rotating member 40. The cam roller 50 is formed of, for example, a resin material, and is rotatably attached to the projecting pin 43 projecting from the rotating plate member 41. As shown in FIG. 10, the cam roller 50 rotates concurrently with the rotating member 40 about the rotating center O. In this case, the cam roller 50 rotates while moving on a contact surface 60 of the elastic member 59 which will be described later.

Figure 4:
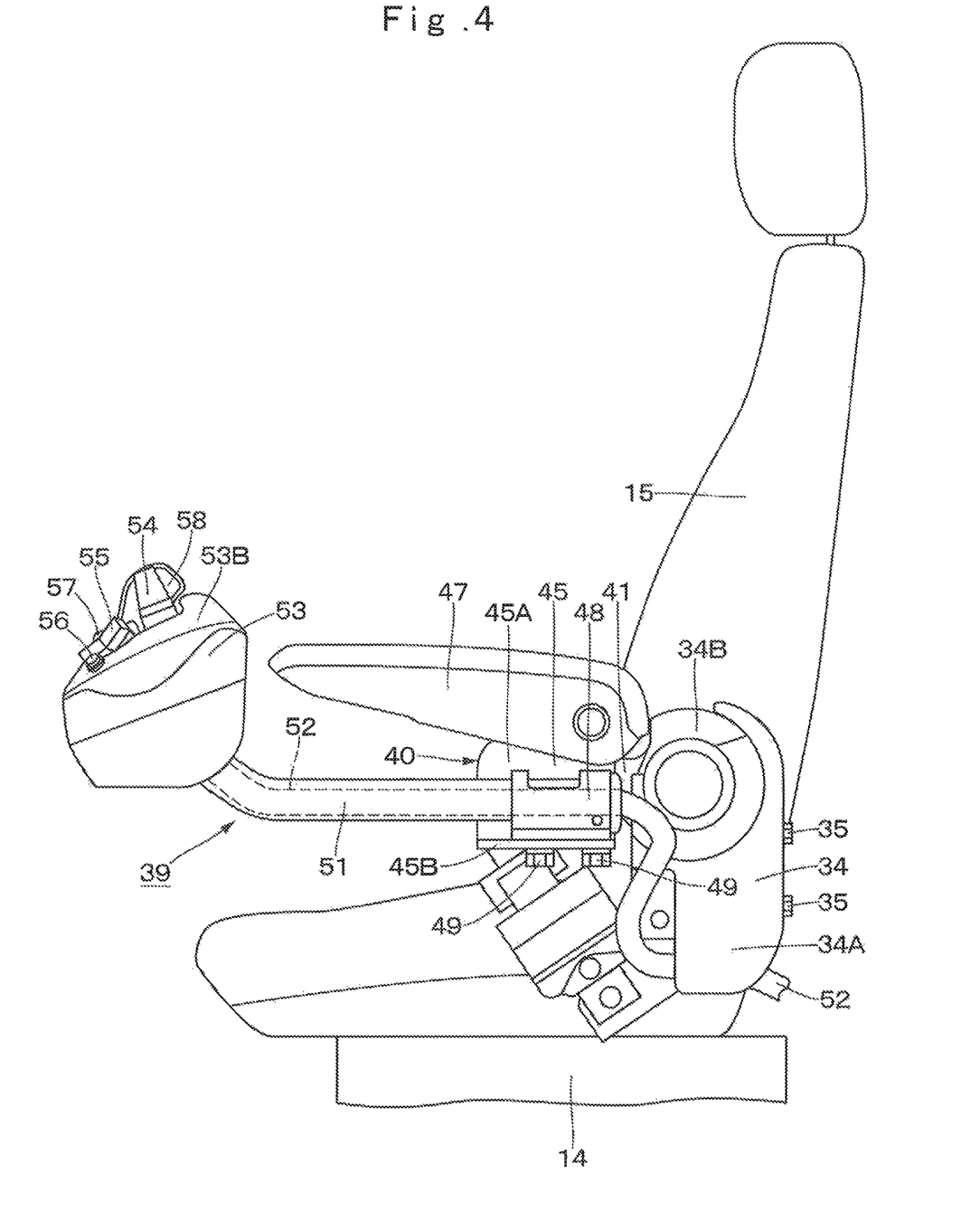
FIG. 4 is a side view of the operator's seat and the left operation device as seen from a direction of arrows IV-IV in FIG. 2.

The hollow pipe 51 extends forward from the rotating member 40. As shown in FIG. 9, a screw seat 51A is secured to a rear end side of the hollow pipe 51 by welding or the like. The hollow pipe 51 is secured with the bolts 49 in a state where a rear end side of the hollow pipe 51 is inserted into the hollow-pipe insertion tool 48. That is, the hollow pipe 51 and the hollow-pipe insertion tool 48 are both fastened to the hollow-pipe mounting plate part 45B with the common bolts 49. On the other hand, as shown in FIG. 4, a front end side of the hollow pipe 51 is bent upward (toward the front side of the left armrest 47), in which an operating tool 53 which will be described later is mounted.

A harness 52 is routed within the hollow pipe 51. The harness 52 includes a plurality of electric wires for, for example, a power supply to the later-described operating tool 53, signal communication from the operating tool 53, and/or the like, and is electrically connected to the operating tool 53.

In this manner, since the structure is simplified by using the hollow pipe 51 to support the operating tool 53 and installing the harness 52 within the hollow pipe 51, the number of components can be reduced to achieve a cost reduction as compared with, for example, a case of using a console box type operating tool stand. Since an operator can grasp the hollow pipe 51 to rotate the operating tool stand 39 between the operating position and the tilt-up position, it is possible to facilitate rotation of the operating tool stand 39.

The operating tool 53 is disposed at a front end side of the operating tool stand 39. The operating tool 53 is disposed at a front end of the hollow pipe 51 to be positioned in front of the left armrest 47. Thus, an operator can easily operate the operating tool 53 while resting his/her arm on the left armrest 47.

The operating tool 53 is provided to operate a travel of the wheel loader 1. A steering-lever selector switch (not shown) is disposed on a right surface 53A of the operating tool 53 on the operator's seat 15-side. A steering lever 54 is disposed on a top surface 53B of the operating tool 53 in the left armrest 47-side. A forward-reverse lever 55 is disposed ahead of the steering lever 54. Further, a down shift switch 56 is disposed on the left side across the forward-reverse lever 55. A wiper switch 57 is disposed on the right side across the forward-reverse lever 55. The operating tool 53 is provided with a plate-shaped miss operation preventing guard 58 that rises upward from the right surface 53A.

The steering-lever selector switch is a selector switch that allows selection between activation and deactivation of an operation of the steering lever 54, the forward-reverse lever 55 and/or the like. Specifically, the steering-lever selector switch allows selection whether the wheel loader 1 is operated to travel by using the steering wheel 16B and the forward-reverse lever 16C or using the steering lever 54 and the forward-reverse lever 55.

The steering lever 54 projects upward from the top surface 53B of the operating tool 53, and is an operating lever capable of tilting in the left-right direction. The steering lever 54 is used in place of the steering wheel 16B, and is operated to tilt in the left-right direction to control the traveling direction of the wheel loader 1.

The forward-reverse lever 55 is operated to cause the wheel loader 1 to travel, and is used in place of the forward-reverse lever 16C. The forward-reverse lever 55 can be shifted among three stages composed of a forward position, a neutral position and a reverse position. The wheel loader 1 can travel forward by, for example, operating the forward-reverse lever 55 to shift from the neutral position to the forward position, and then depressing an accelerator pedal (not shown) which is disposed on the floor plate 13 below the measuring instrument display device 17.

The down shift switch 56 is operated during a loading operation and a transport operation of the wheel loader 1 to shift down (for example, from the third speed to the second or first speed, and the like). The wiper switch 57 is provided to actuate a wiper (not shown) for a glass surface of the cab 12. The miss operation preventing guard 58 is provided to protect the steering lever 54 in the direction of the operator's seat 15. This inhibits accidental contact with the steering lever 54 from a direction of the operator's seat 15.

Next, an explanation will be made of the elastic member 59 disposed in the support member 32.

The elastic member 59 is disposed on the right surface plate 32A of the support member 32. Specifically, as shown in FIG. 8, the elastic member 59 is made of, for example, a rubber material. The elastic member 59 is positioned at and secured to the rear side of a top end of the right surface plate 32A by screwing bolts 61 into nuts 32A1 which are provided on the right surface plate 32A.

The elastic member 59 has a contact surface 60 with which the cam roller 50 comes in elastic contact as the rotating member 40 rotates. As shown in FIG. 10, the contact surface 60 forms part of the front surface of the elastic member 59 and is formed in an arc shape in line with the arc of a rotational movement of the cam roller 50 (an arc-shaped trajectory when the cam roller 50 rotates about the support pin 33 as a rotational pivot).

In this case, the contact surface 60 is configured of a large deforming amount side arc surface 60A and a small deforming amount side arc surface 60B. The large deforming amount side arc surface 60A serving as an arc surface in which the amount of deformation of the elastic member 59 for the cam roller 50 when the operating tool stand 39 is in the operating position side is set larger than that when the operating tool stand 39 is in the tilt-up position side, and the small deforming amount side arc surface 60B in which the amount of deformation of the elastic member 59 for the cam roller 50 when the operating tool stand 39 is in the tilt-up position side is set smaller than that when the operating tool stand 39 is in the operating position side. That is, the contact surface 60 includes the large deforming amount side arc surface 60A which forms an upper side of the contact surface 60 in which the amount of deformation of the elastic member 59 for the cam roller 50 is large, and the small deforming amount side arc surface 60B which forms a lower side of the contact surface 60 in which the amount of deformation of the elastic member 59 for the cam roller 50 is smaller than the large deforming amount side arc surface 60A.

One example is that, when the operating tool stand 39 is positioned at an angle between zero degrees and 40 degrees (the state from FIG. 5 to FIG. 6), the contact surface 60 with which the cam roller 50 comes in contact is the large deforming amount side arc surface 60A. When the operating tool stand 39 is positioned at an angle between 40 degrees and 80 degrees (the state from FIG. 6 to FIG. 7), the contact surface 60 with which the cam roller 50 comes in contact is the small deforming amount side arc surface 60B. It should be noted that a ratio between the large deforming amount side arc surface 60A and the small deforming amount side arc surface 60B of the contact surface 60 is not limited to the above range, and can be set optionally within the rotation range of the operating tool stand 39.

In this case, the large deforming amount side arc surface 60A may be formed as a smaller arc shape than the rotation arc of the cam roller 50 or be made eccentric in natural conditions, for example. Thus, when the cam roller 50 comes in elastic contact with the large deforming amount side arc surface 60A, the rotation resistance of the cam roller 50 and the elastic member 59 (deformation allowance of the elastic member 59, that is, the amount of deformation) can be made larger than the rotation resistance by the small deforming amount side arc surface 60B. The large deforming amount side arc surface 60A has an operating position contact part 60A1 with which the cam roller 50 comes in contact when the operating tool stand 39 is in the operating position. The small deforming amount side arc surface 60B has a tilt-up position contact part 60B1 with which the cam roller 50 comes in contact when the operating tool stand 39 is in the tilt-up position.

That is, the operating position contact part 60A1 and the tilt-up position contact part 60B1 serve as a starting point and an end point of the contact of the cam roller 50 and the contact surface 60. When the cam roller 50 is not located on the large deforming amount side arc surface 60A, that is, when the elastic member 59 is in the natural conditions, as shown in FIG. 10, the large deforming amount side arc surface 60A goes into the state shown by a dashed-two dotted line. In this case, a dimension B from the rotating center O of the rotating plate member 41 of the rotating member 40 to the operating position contact part 60A1 is smaller than a dimension C from the rotating center O of the rotating plate member 41 to the tilt-up position contact part 60B1.

Therefore, while pressing the elastic member 59, the cam roller 50 moves toward the operating position contact part 60A1 on the large deforming amount side arc surface 60A. Because of this, the amount of deformation of the elastic member 59 for the cam roller 50 is increased, so that the rotation resistance of the cam roller 50 and the elastic member 59 is increased. In this case, the magnitude of the rotation resistance of the cam roller 50 and the elastic member 59 (that is, the shape of the large deforming amount side arc surface 60A) is set based on a relationship with the resultant force of the gravity based on the total weight of the operating tool stand 39 and the operating tool 53 and a biasing force of the later-described spring 62, such that, when the operating tool stand 39 approaches the operating position, it moves down smoothly (slowly) to the operating position.

The contact surface 60 of the elastic member 59 is provided with a holding projection 60B2 thereon. The holding projection 60B2 is positioned in a position near the tilt-up position contact part 60B1, and projects from the small deforming amount side arc surface 60B in a convex form. That is, the small deforming amount side arc surface 60B includes the tilt-up position contact part 60B1 with which the cam roller 50 comes in contact in the tilt-up position, and the holding projection 60B2 which is positioned upward of the tilt-up position contact part 60B1 and holds the operating tool stand 39 in the tilt-up position when the operating tool stand 39 is rotated to the tilt-up position. In other words, the holding projection 60B2 is located in a position of the contact surface 60 which makes contact with the cam roller 50 when the cam roller 50 is in the tilt-up position contact part 60B1.

When the operating tool stand 39 is raised from the operating position to the tilt-up position, the cam roller 50 moves from the operating position contact part 60A1 toward the tilt-up position contact part 60B1 while rotating on the contact surface 60 of the elastic member 59. While elastically deforming the holding projection 60B2, the cam roller 50 rides across the holding projection 60B2 and reaches the tilt-up position contact part 60B1. In this case, since the side surface of the cam roller 50 is in contact with the holding projection 60B2, it is restricted for the cam roller 50 to move toward the operating position contact part 60A1. As a result, the operating tool stand 39 is configured to be held in the tilt-up position.

The contact surface 60 of the elastic member 59 is provided with a slowly stopping part 60A2 thereon. The slowly stopping part 60A2 is positioned at a top end side of the contact surface 60, and comes in contact with the cam roller 50 to bring the cam roller 50 to a gentle stop when the operating tool stand 39 rotates to the operating position. That is, the large deforming amount side arc surface 60A includes the operating position contact part 60A1 with which the cam roller 50 comes in contact in the operating position, and the slowly stopping part 60A2 which is positioned upward of the operating position contact part 60A1 and brings the cam roller 50 to a gentle stop when the operating tool stand 39 rotates to the operating position. Thus, the rotating speed of the cam roller 50 can be reduced, which enables a gentle stop of the operating tool stand 39 at the operating position. The slowly stopping part 60A2 extends approximately horizontally from the top end of the large deforming amount side arc surface 60A toward the front side so that the movement of the cam roller 50 toward the operating position contact part 60A1 is controlled when the cam roller 50 approaches the operating position contact part 60A1.

The slowly stopping part 60A2 comes in elastic contact with the cam roller 50 immediately before the cam roller 50 reaches the operating position contact part 60A1, to reduce the rotating speed of the cam roller 50 and the rotating member 40. The operating tool stand 39 is held in the operating position while maintaining the cam roller 50 elastically deforming the slowly stopping part 60A2, by gravity based on the total weight of the operating tool stand 39 and the operating tool 53 and on a biasing force of the later-described spring 62.

The contact between the cam roller 50 and the slowly stopping part 60A2 is made before the contact between the operating position abutting part 41A of the rotating plate member 41 and the restricting projection 36B of the stopper 36. Because of this, in a state where the rotating speed of the rotating plate member 41 is reduced, the operating position abutting part 41A comes in contact with the restricting projection 36B. Therefore, the impact on the restricting projection 36B and the rotating plate member 41 is reduced, so that the impact on the operating tool stand 39 and the operating tool 53 can be reduced. As a result, the stopper 36, the rotating member 40, the operating tool stand 39 and the operating tool 53 can be increased in lifespan.

Figure 6:
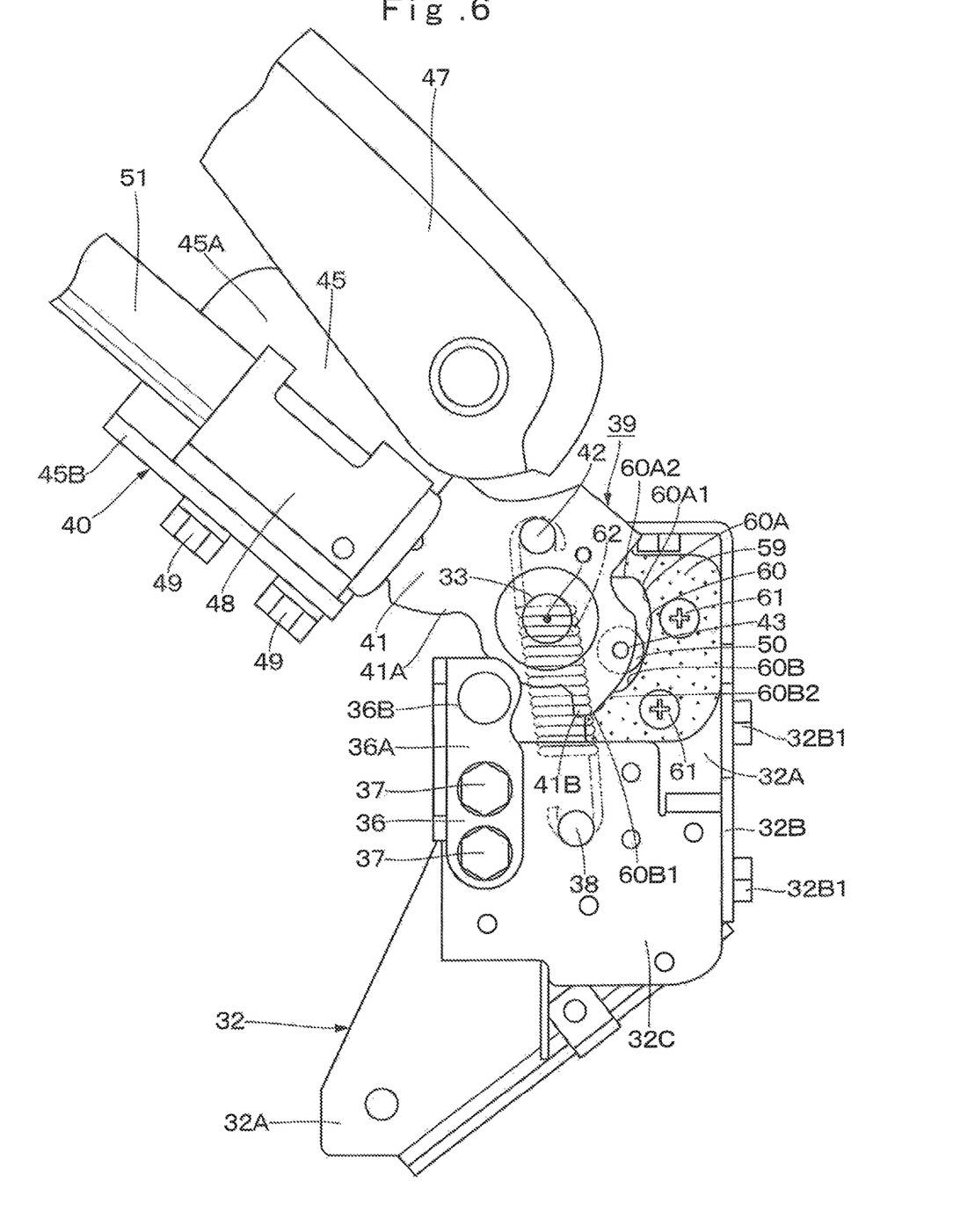
FIG. 6 is an enlarged side view of an essential part of the left operation device in FIG. 5 in a state in which an operating tool stand is raised by 40 degrees.

The spring 62 is installed between the lower side fixing part 38 provided on the left surface plate 32C and the upper side fixing part 42 provided on the rotating plate member 41. The top end side of the spring 62 is rotatably locked by the upper side fixing part 42. On the other hand, the bottom end side of the spring 62 is rotatably locked by the lower side fixing part 38. The spring 62 is arranged to go into the most contracted state when the operating tool stand 39 is in the operating position and in the tilt-up position. The spring 62 is arranged to go into the most expanded state when, for example, as shown in FIG. 6, the operating tool stand 39 is tilted up by 40 degrees from the operating position.

Thus, when the operating tool stand 39 is rotated from the operating position to the tilt-up position, as the tilt angle of the operating tool stand 39 exceeds 40 degrees, the operating tool stand 39 can be tilted up to the tilt-up position by the biasing force of the spring 62. Because of this, a reduction in the operating force on the operating tool stand 39 is achieved. The spring 62 provides a biasing force capable of holding the operating tool stand 39 in the tilt-up position in conjunction with the holding projection 60B2.

On the other hand, when the operating tool stand 39 is rotated from the tilt-up position to the operating position, as the tilt angle of the operating tool stand 39 exceeds 40 degrees, the operating tool stand 39 is increased in rotating speed toward the operating position by the biasing force of the spring 62. However, the amount of deformation of the large deforming amount side arc surface 60A for the cam roller 50 is larger as compared with the amount of deformation of the small deforming amount side arc surface 60B for the cam roller 50. That is, the rotation resistance between the cam roller 50 and the large deforming amount side arc surface 60A is higher as compared with the rotation resistance between the cam roller 50 and the small deforming amount side arc surface 60B.

Thus, the operating tool stand 39 moves smoothly toward the operating position against the biasing force of the spring 62. When the operating tool stand 39 is in the operating position, the operating tool stand 39 can be held by the biasing force of the spring 62. Hence, it is possible to reduce fluttering (bounds) of operating tool stand 39 caused by vibrations induced by working of the wheel loader 1, and/or the like.

The left operation device 31 of the wheel loader 1 according to the present embodiment has the configuration as described above. Next, an explanation will be made of the operation when the wheel loader 1 is used to carryout excavation and transportation of earth and sand, and/or the like.

Initially, an operator gets in the cab 12 and sits on the operator's seat 15. The wheel loader 1 is caused to travel by operating the steering wheel 16B and the accelerator pedal (not shown). On the other hand, for carrying out excavation and transportation of earth and sand, and/or the like, in lieu of the driving operation using the steering wheel 16B, the right operation device 18 and the left operation device 31 are used to perform a working operation.

That is, for the excavating work and transporting work for earth and sand, and/or the like, first, the steering lever selector switch (not shown) on the right surface 53A of the operating tool 53 is operated to switch the traveling operation of the wheel loader 1 from the steering wheel 16B and the forward-reverse lever 16C to the steering lever 54 and the forward-reverse lever 55 of the operating tool 53.

An operator can operate the operating lever 21 of the right operation device 18 to tilt and lift the arm 7 and the bucket 8 to excavate and scoop up earth and sand, and/or the like. In this case, the operator can operate the forward-reverse lever 55 and the steering lever 54 of the operating tool 53 of the left operation device 31 to cause the wheel loader 1 to travel.

Next, an explanation will be made of a case where an operator moves up the left operation device 31 from the operating position to the tilt-up position to get in the cab 12.

Initially, an operator opens the door 12B of the cab box 12A. Then, the operator grasps and raises the hollow pipe 51 forming part of the operating tool stand 39 of the left operation device 31. This enables the operating tool stand 39 to retract rearward, so that a wider entrance passage between the entrance way 12A1 and the operator's seat 15 can be ensured to allow the operator to sit on the operator's seat 15. The operator then moves down the operating tool stand 39 from the tilt-up position to the operating position to be able to perform a driving operation of the wheel loader 1.

Incidentally, in the above-described conventional art, the operation device is retracted to the tilt-up position by the reaction force of the gas damper, and when the operation device is moved down to the operating position, the resistance of the gas damper is used to reduce the moving-down speed. Therefore, there is a problem that a larger operating force is required to move down the operation device. The gas damper must be accommodated within the operation device, giving rise to a problem of an increase in size of the operation device.

To address these, in the present embodiment, the left operation device 31 is configured to include the support member 32 disposed on the left side of the operator's seat 15, the operating tool stand 39 rotatably mounted to the support member 32, and the operating tool 53 mounted to the front end side of the operating tool stand 39.

Hereinafter, an explanation will be made of the rotating mechanism of the left operation device 31 with reference to FIG. 5 to FIG. 7 and FIG. 10.

When an operator grasps and moves up the hollow pipe 51, the operating tool stand 39 rotates from the operating position (the state in FIG. 5) toward the tilt-up position (the state in FIG. 7) about the support pin 33 serving as a rotational pivot (rotating center O), in which the support pin 33 is provided on the right surface plate 32A of the support member 32. The cam roller 50, which is rotatably mounted to the projecting pin 43 of the rotating plate member 41, moves on the contact surface 60 of the elastic member 59 from the operating position contact part 60A1 toward the tilt-up position contact part 60B1.

When the operating tool stand 39 rotates beyond 40 degrees from the operating position (the state in FIG. 6), the cam roller 50 moves on the small deforming amount side arc surface 60B of the contact surface 60 of the elastic member 59. In this case, the amount of deformation of the small deforming amount side arc surface 60B for the cam roller 50 becomes small. Further, the spring 62 provides a biasing force acting in the contracting direction. Thus, the cam roller 50 reduces rotation resistance to the contact surface 60. Because of this, it is possible to reduce the operating force when the operating tool stand 39 is retracted to the tilt-up position.

When the operating tool stand 39 approaches the tilt-up position, the cam roller 50 rides across the holding projection 60B2 while elastically deforming the holding projection 60B2 positioned upward of the tilt-up position contact part 60B1, and then the cam roller 50 reaches the tilt-up position contact part 60B1. As shown in FIG. 7, when the operating tool stand 39 is in the tilt-up position, the tilt-up position abutting part 41B of the rotating plate member 41 comes in contact with the restricting projection 36B of the stopper 36, whereby the operating tool stand 39 is prohibited from being retracted further backward.

The cam roller 50 is positioned in the tilt-up position contact part 60B1 to be in contact with the holding projection 60B2, thereby being prohibited from movement toward the operating position contact part 60A1. Moreover, the cam roller 50 is prohibited from moving toward the operating position contact part 60A1 by the biasing force of the spring 62 as well. This enables the operating tool stand 39 to be held in the tilt-up position.

Then, when an operator sits on the operator's seat 15 and moves down the operating tool stand 39 from the tilt-up position to the operating position, he/she grasps the hollow pipe 51 of the operating tool stand 39 to move down the operating tool stand 39. Thus, the operating tool stand 39 can be moved to the operating position, carrying out the traveling and excavating work of the wheel loader 1.

In this case, the cam roller 50 rides across the holding projection 60B2 and then moves toward the operating position contact part 60A1. When the operating tool stand 39 rotates downward beyond 40 degrees from the tilt-up position, the cam roller 50 moves on the large deforming amount side arc surface 60A of the contact surface 60 of the elastic member 59. In this case, the amount of deformation of the large deforming amount side arc surface 60A for the cam roller 50 becomes large. Because of this, the rotation resistance between the cam roller 50 and the contact surface 60 increases, so that the operating tool stand 39 can move smoothly toward the operating position.

When the operating tool stand 39 approaches the operating position, the cam roller 50 comes in elastic contact with the slowly stopping part 60A2 positioned upward of the operating position contact part 60A1, so that the rotating speed of the operating tool stand 39 is further reduced. Then, the operating position abutting part 41A of the rotating plate member 41 comes in contact with the restricting projection 36B of the stopper 36, thereby prohibiting the operating tool stand 39 from moving further downward. The spring 62 provides a biasing force to prohibit an upward movement of the operating tool stand 39. This enables a reduction in fluttering of operating tool stand 39 caused by, for example, vibrations of the wheel loader 1 and/or the like.

Thus, the left operation device 31 of the wheel loader 1 according to the present embodiment includes the contact surface 60 of the elastic member 59 for the cam roller 50 configured of the large deforming amount side arc surface 60A with a larger amount of deformation and the small deforming amount side arc surface 60B with a small amount of deformation for the cam roller 50. That is, the contact surface 60 of the elastic member 59 is configured of the large deforming amount side arc surface 60A located on the upper side and the small deforming amount side arc surface 60B located on the lower side. The large deforming amount side arc surface 60A is disposed in a part with which the cam roller 50 comes in contact when the operating tool stand 39 is in the operating position. On the other hand, the small deforming amount side arc surface 60B is disposed in a part with which the cam roller 50 comes in contact when the operating tool stand 39 is in the tilt-up position.

The contact surface 60 has the operating position contact part 60A1 coming in contact with the cam roller 50 in the operating position and the tilt-up position contact part 60B1 coming in contact with the cam roller 50 in the tilt-up position. The dimension B from the rotating center O of the rotating plate member 41 to the operating position contact part 60A1 is formed to be smaller than the dimension C from the rotating center O of the rotating plate member 41 to the tilt-up position contact part 60B1.

Because of this, the operating force required to move down the operating tool stand 39 from the tilt-up position to the operating position can be reduced during movement of the cam roller 50 on the small deforming amount side arc surface 60B. When the operating tool stand 39 approaches the operating position, the cam roller 50 moves on the large deforming amount side arc surface 60A, enabling a reduction in rotating speed of the cam roller 50. This enables a smooth movement of the operating tool stand 39 toward the operating position.

The cam roller 50 which rotates together with the rotating member 40 is brought into elastic contact with the elastic member 59 to rotate the operating tool stand 39 smoothly to the operating position. This eliminates the need to install a long gas damper or the like within the left operation device 31, therefore making it possible to downsize the left operation device 31.

Further, the contact surface 60 is provided with the holding projection 60B2 that is positioned upward of the tilt-up position contact part 60B1 to hold the operating tool stand 39 in the tilt-up position. This makes it possible to minimize the possibility that, for example, the operating tool stand 39 is moved down to the operating position by wind or the like. Because of this, an improved safety when an operator gets in the cab 12 can be achieved.

The contact surface 60 includes the slowly stopping part 60A2 positioned upward of the operating position contact part 60A1 to make the cam roller 50 gently stop when the operating tool stand 39 rotates until the operating position. This enables a gentle stop of the operating tool stand 39 at the operating position. Therefore, it is possible to minimum the possibility that the operating tool stand 39 rebounds at the operating position. Gently stopping the cam roller 50 enables a reduction in impact on the operating tool stand 39, the operating tool 53 and the like, so that the lifespan of each of the operating tool stand 39, the operating tool 53 and the like can be increased.

The operating tool stand 39 includes the hollow pipe 51 extending forward from the rotating member 40. The operating tool 53 is mounted at the front end side of the hollow pipe 51. Because of this, the left operation device 31 can be simplified to reduce the number of components, leading to a reduction in cost. The reduction in the number of components enables a reduction in weight of the operating tool stand 39. This makes it possible to grasp the hollow pipe 51 to rotate the operating tool stand 39 between the operating position and the tilt-up position in an effortless manner.

The harness 52, which is electrically connected to the operating tool 53, is disposed within the hollow pipe 51. As a result, the harness 52 is prevented from being disposed to messily spread out around the left operation device 31, therefore enabling an operator to get in the cab 12 without concern for the harness 52.

It should be noted that the present embodiment has been described using the left operation device 31 disposed on the left side of the operator's seat 15 as an example of operation devices for construction machines. However, the present invention is not limited to the above embodiment. For example, the present invention may be applied to a right operation device disposed on the right side of the operator's seat 15.

The above-described present embodiment has been described using the operation device (the left operation device 31) of the wheel loader 1 as an example. However, the present invention is not limited to the above embodiment, and, for example, the present invention may be applied to an operation device of another construction machine such as a hydraulic excavator or the like.

DESCRIPTION OF REFERENCE NUMERALS

1: Wheel loader (Construction machine)
15: Operator's seat
31: Left operation machine (Operation machine)
32: Support member
33: Support pin
39: Operating tool stand
40: Rotating member
50: Cam roller
51: Hollow pipe
52: Harness
53: Operating tool
59: Elastic member
60: Contact surface
60A: Large deforming amount side arc surface (Arc surface)
60A1: Operating position contact part
60A2: Slowly stopping part
60B: Small deforming amount side arc surface
60B1: Tilt-up position contact part
60B2: Holding projection
O: Rotating center
B: Dimension from rotating center to operating-position contact part
C: Dimension from rotating center to tilt-up position contact part

The invention claimed is:

1. An operation device for a construction machine comprising:
a support member that is disposed on at least one of both left and right sides of an operator's seat installed in said construction machine;
an operating tool stand that is disposed to said support member and is rotatable between an operating position in which said operating tool stand extends forward from said support member and a tilt-up position in which said operating tool stand extends upward with respect to said support member; and an operating tool that is disposed at a front end side of said operating tool stand to operate said construction machine, characterized in that:

said operating tool stand includes;

a rotating member that is rotatably mounted about a support pin as a rotational pivot, said supporting pin being mounted to said support member, and a cam roller that is rotatably mounted to said rotating member and rotates together with said rotating member;

said support member is provided with an elastic member that has a contact surface with which said cam roller comes in elastic contact in accordance with rotation of said rotating member;

said contact surface of said elastic member has an operating position contact part with which said cam roller comes in contact in said operating position, and a tilt-up position contact part with which said cam roller comes in contact in said tilt-up position; and a dimension (B) from a rotating center (O) of said rotating member to said operating position contact part is formed to be smaller than a dimension (C) from the rotating center (O) of said rotating member to said tilt-up position contact part.

2. The operation device for the construction machine according to claim 1, wherein said contact surface of said elastic member has an arc surface that is set such that the amount of deformation of said elastic member for said cam roller when said operating tool stand is in said operating position side is larger than the amount of deformation of said elastic member for said cam roller when said operating tool stand is in said tilt-up position side.

3. The operation device for the construction machine according to claim 1, wherein said contact surface of said elastic member includes;

a large deforming amount side arc surface that forms an upper side of said contact surface in which the amount of deformation of said elastic member for said cam roller is large, and a small deforming amount side arc surface that forms a lower side of said contact surface in which the amount of deformation of said elastic member for said cam roller is smaller than said large deforming amount side arc surface.

4. The operation device for the construction machine according to claim 1, wherein said contact surface of said elastic member is provided with a slowly stopping part which allows said cam roller to stop gently when said operating tool stand is rotated to said operating position.

5. The operation device for the construction machine according to claim 1, wherein said contact surface of said elastic member is provided with a holding projection which holds said operating tool stand in said tilt-up position.

6. The operation device for the construction machine according to claim 3, wherein said large deforming amount side arc surface is provided with said operating position contact part with which said cam roller comes in contact in said operating position, and a slowly stopping part which is positioned upward of said operating position contact part and allows said cam roller to stop gently when said operating tool stand is rotated to said operating position.

7. The operation device for the construction machine according to claim 3, wherein said small deforming amount side arc surface is provided with said tilt-up position contact part with which said cam roller comes in contact in said tilt-up position, and a holding projection which is positioned upward of said tilt-up position contact part and holds said operating tool stand in said tilt-up position when said operating tool stand is rotated to said tilt-up position.

* * * * *